US011911873B2

(12) United States Patent
Simpson et al.

(10) Patent No.: US 11,911,873 B2
(45) Date of Patent: Feb. 27, 2024

(54) METHODS, PRECURSORS, AND ABRASIVE BLASTING MASKS FOR MANUFACTURING NOISE ATTENUATING DEVICES

(71) Applicant: SHORT BROTHERS PLC, Belfast (GB)

(72) Inventors: Derek Simpson, Belfast (GB); Tony Millar, Belfast (GB)

(73) Assignee: Short Brothers PLC, Belfast (GB)

( * ) Notice: Subject to any disclaimer, the term of this patent is extended or adjusted under 35 U.S.C. 154(b) by 168 days.

(21) Appl. No.: 17/337,656

(22) Filed: Jun. 3, 2021

(65) Prior Publication Data
US 2021/0283747 A1    Sep. 16, 2021

Related U.S. Application Data

(62) Division of application No. 15/779,433, filed as application No. PCT/GB2016/053624 on Nov. 22, 2016, now abandoned.

(30) Foreign Application Priority Data

Nov. 30, 2015  (GB) ..................... 1521075

(51) Int. Cl.
*B24C 1/04* (2006.01)
*B32B 7/12* (2006.01)
(Continued)

(52) U.S. Cl.
CPC ............. *B24C 1/04* (2013.01); *B32B 3/12* (2013.01); *B32B 3/266* (2013.01); *B32B 5/024* (2013.01); *B32B 5/26* (2013.01); *B32B 7/05* (2019.01); *B32B 7/12* (2013.01); *B32B 15/08* (2013.01); *B32B 15/12* (2013.01); *B32B 15/14* (2013.01); *B32B 15/20* (2013.01); *B32B 29/02* (2013.01); *B32B 37/12* (2013.01); *B32B 37/146* (2013.01); *B64D 33/02* (2013.01); *F02C 7/24* (2013.01); *G10K 11/168* (2013.01); *G10K 11/172* (2013.01); *B32B 2250/03* (2013.01); *B32B 2250/04* (2013.01); *B32B 2250/40* (2013.01); *B32B 2260/021* (2013.01); *B32B 2260/046* (2013.01); *B32B 2262/02* (2013.01); *B32B 2262/0269* (2013.01);
(Continued)

(58) Field of Classification Search
CPC ..... F02C 7/24; B24C 1/04; B32B 3/12; B32B 3/266; B32B 7/12; B32B 37/12; B64D 33/02; B64D 2033/0206; G10K 11/168
USPC ......................................... 181/292
See application file for complete search history.

(56) References Cited

U.S. PATENT DOCUMENTS 4,612,737 A * 9/1986 Adee .................... G10K 11/172
451/29
4,743,740 A * 5/1988 Adee .................... B64D 15/00
219/547
(Continued)

*Primary Examiner* — Jeremy A Luks
(74) *Attorney, Agent, or Firm* — Hovey Williams LLP

(57) ABSTRACT

Noise attenuating devices and methods, precursors and abrasive blasting masks for manufacturing noise attenuating devices are disclosed. An exemplary method disclosed herein includes bonding a facing sheet of the noise attenuating device to a cellular core and then perforating the facing sheet. Perforating the facing sheet may be performed by abrasive blasting using a mask configured to prevent the abrasive blasting of an underlying structure.

13 Claims, 10 Drawing Sheets

(51) Int. Cl.
*B32B 3/12* (2006.01)
*B32B 37/12* (2006.01)
*F02C 7/24* (2006.01)
*G10K 11/168* (2006.01)
*B64D 33/02* (2006.01)
*B32B 3/26* (2006.01)
*B32B 5/02* (2006.01)
*B32B 15/20* (2006.01)
*B32B 5/26* (2006.01)
*B32B 15/14* (2006.01)
*B32B 29/02* (2006.01)
*B32B 15/12* (2006.01)
*B32B 15/08* (2006.01)
*G10K 11/172* (2006.01)
*B32B 7/05* (2019.01)
*B32B 37/14* (2006.01)

(52) U.S. Cl.
CPC ... *B32B 2262/101* (2013.01); *B32B 2262/103* (2013.01); *B32B 2262/106* (2013.01); *B32B 2307/102* (2013.01); *B32B 2307/732* (2013.01); *B32B 2605/00* (2013.01); *B32B 2605/10* (2013.01); *B32B 2605/18* (2013.01); *B64D 2033/0206* (2013.01)

(56) References Cited

U.S. PATENT DOCUMENTS

| | | | | |
|---|---|---|---|---|
| 4,759,513 A | * | 7/1988 | Birbragher | F02C 7/045 244/1 N |
| 5,066,450 A | * | 11/1991 | Steinicke | B26F 1/26 264/504 |
| 6,371,242 B1 | * | 4/2002 | Wilson | B32B 7/12 428/116 |
| 6,827,180 B2 | * | 12/2004 | Wilson | B23K 26/389 181/292 |
| 7,157,015 B2 | * | 1/2007 | Shimizu | G02B 3/0031 216/96 |
| 7,600,609 B2 | * | 10/2009 | Nakamura | G10K 11/162 181/290 |
| 7,946,385 B2 | * | 5/2011 | Lalane | G10K 11/172 181/290 |
| 8,196,704 B2 | * | 6/2012 | Chiou | G10K 11/168 181/292 |
| 9,016,042 B2 | * | 4/2015 | Chiou | F02K 1/64 137/15.1 |
| 10,577,522 B2 | * | 3/2020 | Awkal | C09J 7/10 |
| 2009/0163115 A1 | * | 6/2009 | Vyas | B24C 1/04 451/31 |
| 2013/0075193 A1 | * | 3/2013 | Vavalle | F02C 7/045 156/253 |
| 2015/0267593 A1 | * | 9/2015 | Lauder | G10K 11/172 409/143 |
| 2015/0306815 A1 | * | 10/2015 | Braden | B29C 59/16 156/272.8 |
| 2018/0082671 A1 | * | 3/2018 | Roach | G10K 11/168 |
| 2019/0232580 A1 | * | 8/2019 | Wilson | B32B 7/06 |

* cited by examiner

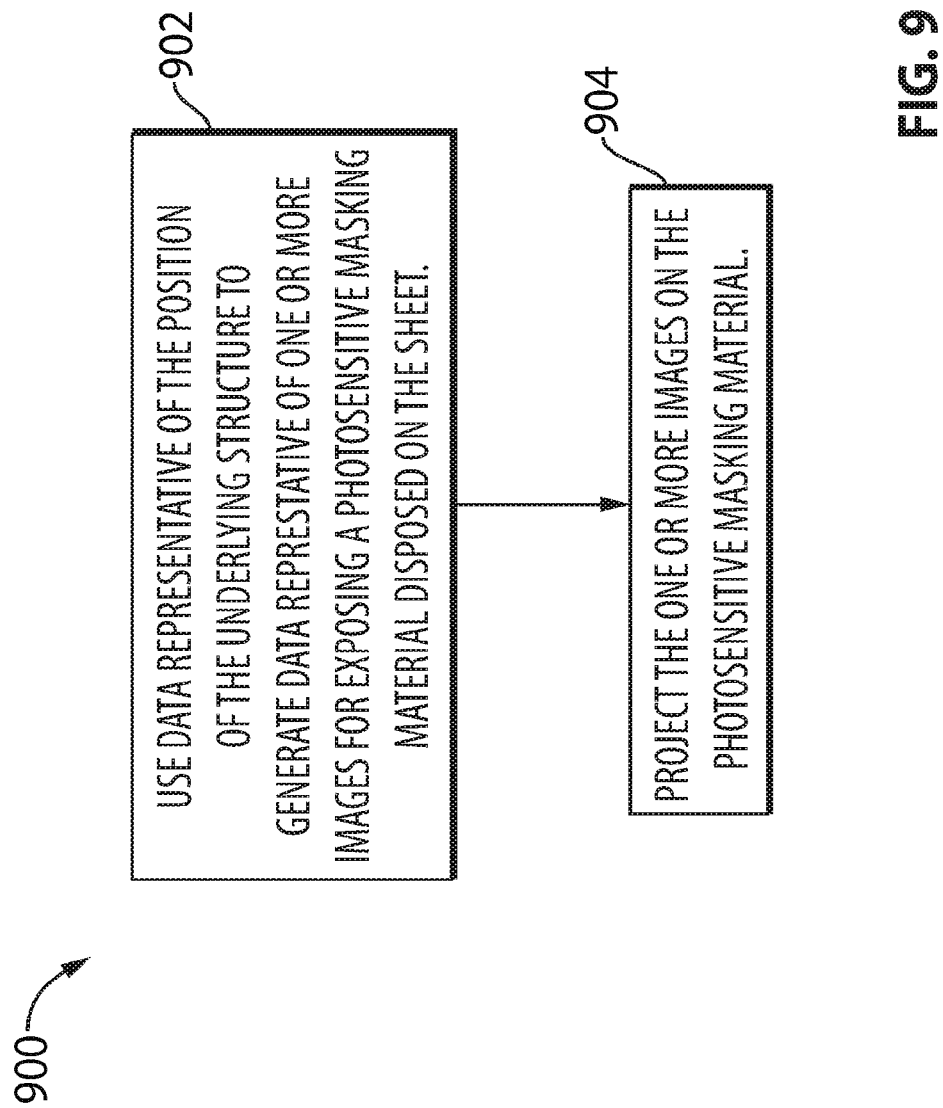

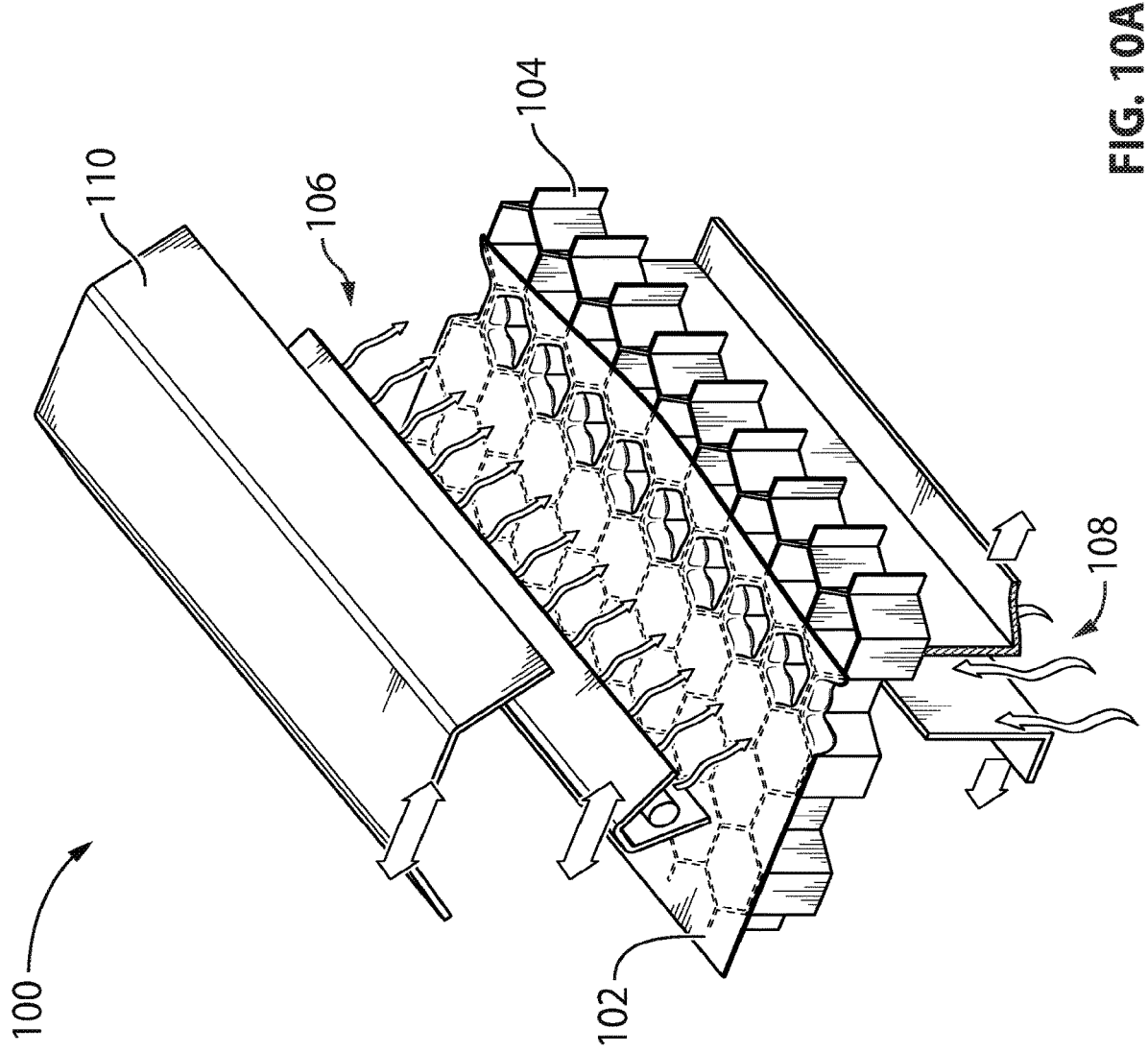

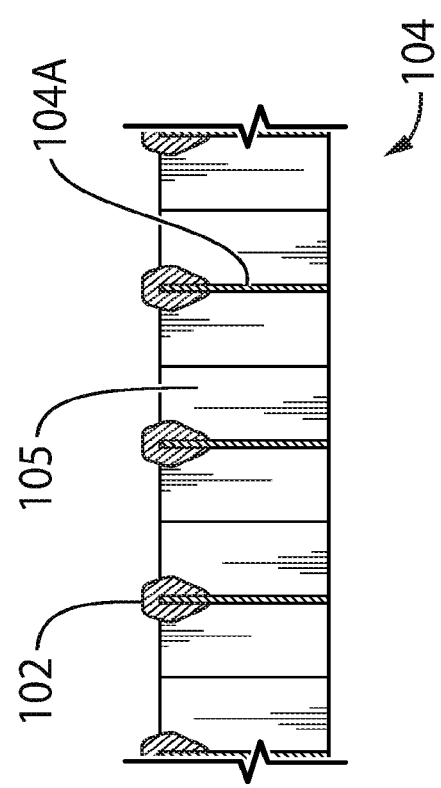

METHODS, PRECURSORS, AND ABRASIVE BLASTING MASKS FOR MANUFACTURING NOISE ATTENUATING DEVICES

CROSS-REFERENCE TO RELATED APPLICATION(S)

This regular utility non-provisional application is a divisional of U.S. patent application Ser. No. 15/779,433, § 371(c) Date of May 25, 2018, titled Methods, Precursors, and Abrasive Blasting Masks for Manufacturing Noise Attenuating Devices. Application Ser. No. 15/779,433 is a U.S. National Stage entry of International Patent Application No. PCT/GB2016/053624, filed on Nov. 22, 2016, which claims priority from UK Patent Application No. GB 1521075.0, filed on Nov. 30, 2015. The above-mentioned patent applications are hereby incorporated by reference in their entireties.

FIELD OF THE INVENTION

The disclosure relates generally to noise attenuating devices, and more particularly to methods, precursors and abrasive blasting masks for manufacturing such noise attenuating devices.

BACKGROUND OF THE INVENTION

Reducing aircraft noise is important to the growth of air transport and for improving the quality of life of people living near airports. The noise associated with an aircraft can be produced from various sources on the aircraft and by various mechanisms. For example, a fan of a turbofan aircraft engine can be a dominant source of noise during take-off and landing of an aircraft having modern high-bypass ratio turbofan aircraft engines.

The use of noise attenuating devices inside aircraft engines is known. Existing noise attenuating devices can be designed to achieve a desired acoustic performance. However, designing and manufacturing such noise attenuating devices to the specifications required to achieve the desired acoustic performance can be difficult, time-consuming and expensive. Improvement is desirable.

SUMMARY OF THE INVENTION

In one aspect, the disclosure describes a method for manufacturing a noise-attenuating device comprising a facing sheet having an outer side and an inner side and a cellular core. The method comprises:
 bonding the facing sheet to the cellular core so that the inner side of the facing sheet faces a first side of the cellular core; and
 after bonding the facing sheet to the cellular core, perforating the facing sheet.

The method may comprise bonding a backing plate to a second side of the cellular core before perforating the facing sheet, the second side being opposite to the first side.

Bonding the facing sheet to the cellular core may comprise applying an adhesive film to the inner side of the facing sheet and then joining the facing sheet and the cellular core.

The adhesive film may uniformly cover a region of the inner side of the facing sheet where the region has an area that covers more than one cell of the cellular core.

The method may comprise forming one or more holes through the adhesive film when perforating the facing sheet.

Perforating the facing sheet may comprise abrasive blasting the facing sheet.

The method may comprise masking the outer side of the facing sheet at locations where the facing sheet is to remain imperforated.

The method may comprise masking the outer side of the facing sheet at locations of the facing sheet overlapping any walls of the cellular core in order to substantially prevent the walls of the cellular core from being abrasively blasted during perforation.

The method may comprise producing an abrasive blasting mask by:
 applying a photosensitive masking material on the outer side of the facing sheet; and
 selectively exposing the photosensitive masking material to light configured to activate the photosensitive masking material.

Selectively exposing the photosensitive masking material to light may comprise projecting one or more images on the photosensitive masking material. The one or more images may be configured to cause the formation of one or more holes in the photosensitive masking material in a region not overlapping the structure of the cellular core and substantially avoid the formation of holes in the photosensitive masking material in a region overlapping a structure of the cellular core.

The method may comprise using data representative of a position of at least part of the cellular core to generate data representative of the one or more images.

The one or more images may comprise a single image incorporating both the data representative of the position of at least part of the cellular core and data representative of one or more holes desired in the facing sheet. The single image may define an outline of one or more walls of the cellular core and the one or more holes desired in the facing sheet.

The one or more images may comprise:
 a first image incorporating data representative of one or more holes desired in the facing sheet; and
 a second image incorporating the data representative of the position of at least part of the cellular core.

The method may comprise projecting the first image and the second image sequentially.

The data representative of the position of at least part of the cellular core may comprise a thermographic image of a precursor to the noise attenuating device comprising the cellular core.

The data representative of the position of at least part of the cellular core may comprise an X-ray image of a precursor to the noise attenuating device comprising the cellular core.

The method may comprise, after perforating the facing sheet, bonding a layer of porous material to the outer side of the facing sheet.

In another aspect, the disclosure describes a precursor for manufacturing a noise attenuating device. The precursor comprises:
 a cellular core having a first side; and
 an imperforated facing sheet having an outer side and an inner side, the imperforated facing sheet being bonded to the first side of the cellular core so that the inner side of the facing sheet faces the first side of the cellular core.

The precursor may comprise a backing plate bonded to a second side of the cellular core, wherein the second side is opposite to the first side.

The precursor may comprise an adhesive film disposed on the inner side of the facing sheet. The adhesive film may uniformly cover a region of the inner side of the facing sheet where the region has an area that covers more than one cell of the cellular core.

The precursor may comprise a mask overlaying the outer side of the facing sheet and configured to substantially prevent abrasive blasting of the facing sheet at locations where the facing sheet is to remain imperforated.

The precursor may comprise a mask overlaying the outer side of the facing sheet and configured to substantially prevent abrasive blasting of the facing sheet at locations of the facing sheet overlapping any walls of the cellular core.

The precursor may comprise:
a first mask portion overlaying the outer side of the facing sheet and comprising a plurality of holes configured to permit passage of abrasive material through the mask to perforate the facing sheet; and
a second mask portion configured to block one or more of the plurality of holes in the first mask portion that overlap walls of the cellular core in order to substantially prevent the walls of the cellular core from being abrasively blasted.

The facing sheet may comprise a composite laminate.

In another aspect, the disclosure describes a noise attenuating device comprising:
a cellular core having a first side;
a perforated facing sheet having an outer side and an inner side, the perforated facing sheet being bonded to the first side of the cellular core so that the inner side of the facing sheet faces a first side of the cellular core; and
an adhesive film disposed on the inner side of the facing sheet where one or more holes extending through the perforated sheet also extend through the adhesive film.

The noise attenuating device may comprise a backing plate bonded to a second side of the cellular core, wherein the second side is opposite to the first side.

The adhesive film may uniformly cover a region of the inner side of the facing sheet where the region has an area that covers more than one cell of the cellular core.

The facing sheet may be imperforated at locations of the facing sheet overlapping any walls of the cellular core.

In another aspect, the disclosure describes an aircraft comprising a noise attenuating device as described herein.

In another aspect, the disclosure describes an apparatus for use during perforation of a facing sheet of a noise attenuating device using abrasive blasting where the facing sheet is bonded to a cellular core before perforation. The apparatus comprises:
a mask configured to overlay the facing sheet and comprising a plurality of holes configured to permit passage of abrasive material through the mask to perforate the facing sheet during abrasive blasting, the mask being configured to substantially prevent abrasive blasting of the facing sheet at locations of the facing sheet overlapping any walls of the cellular core.

The mask may comprise a region overlapping any walls of the cellular core in which no holes are present in order to substantially prevent the walls of the cellular core from being abrasively blasted.

The apparatus may comprise:
a first mask portion comprising the plurality of holes configured to permit passage of abrasive material through the first mask portion to perforate the facing sheet; and
a second mask portion configured to block one or more of the plurality of holes in the first mask portion that overlap walls of the cellular core in order to substantially prevent the walls of the cellular core from being abrasively blasted.

In another aspect, the disclosure describes a mask for use during perforation of a facing sheet of a noise attenuating device using abrasive blasting where the facing sheet is bonded to a cellular core before perforation. The mask comprises:
a first mask portion configured to overlay the facing sheet and comprising a plurality of holes configured to permit passage of abrasive material through the first mask portion to perforate the facing sheet; and
a second mask portion configured to block one or more of the plurality of holes in the first mask portion that overlap walls of the cellular core in order to substantially prevent the walls of the cellular core from being abrasively blasted.

The second mask portion may overlay the first mask portion.

In another aspect, the disclosure describes a method for producing an abrasive blasting mask for use during the perforation of a sheet and preventing the abrasive blasting of an underlying structure. The method comprises:
using data representative of the position of the underlying structure and data representative of one or more holes desired in the sheet, generating data representative of one or more images for exposing a photosensitive masking material disposed on the sheet, the one or more images being configured to cause the formation of one or more holes in the photosensitive masking material in a region not overlapping the underlying structure and substantially avoid the formation of holes in the photosensitive masking material in a region overlapping the underlying structure; and
projecting the one or more images on the photosensitive masking material to expose the photosensitive masking material and produce the abrasive blasting mask for preventing the abrasive blasting of the underlying structure.

The one or more images may comprise a single image incorporating both the data representative of the position of the underlying structure and the data representative of the one or more holes desired in the sheet. The single image may define an outline of the underlying structure and one or more holes desired in the sheet.

The one or more images may comprise:
a first image incorporating the data representative of the one or more holes desired in the sheet; and
a second image incorporating the data representative of the position of the underlying structure.

The method may comprise projecting the first image and the second image sequentially.

The data representative of the position of the underlying structure may comprise a thermographic image showing the underlying structure.

The data representative of the position of the underlying structure may comprise an X-ray image showing the underlying structure.

The sheet may be a facing sheet of a noise attenuation device and the underlying structure may be a cellular core of the noise attenuation device.

In another aspect, the disclosure describes a system configured to produce an abrasive blasting mask as disclosed herein.

Further details of these and other aspects of the subject matter of this application will be apparent from the detailed description and drawings included below.

BRIEF DESCRIPTION OF THE DRAWINGS

Reference is now made to the accompanying drawings, in which:

FIG. 9 is a flowchart illustrating an exemplary method for producing an abrasive blasting mask for use during the perforation of the facing sheet of FIG. 1;

FIG. 10A is a schematic representation of an apparatus for automated reticulation of an adhesive; and FIG. 10B is a cross-section view of an exemplary cellular core comprising an adhesive that has been applied to the top edges of walls using automated adhesive reticulation.

DESCRIPTION OF EMBODIMENT(S) OF THE INVENTION

Figure 1:
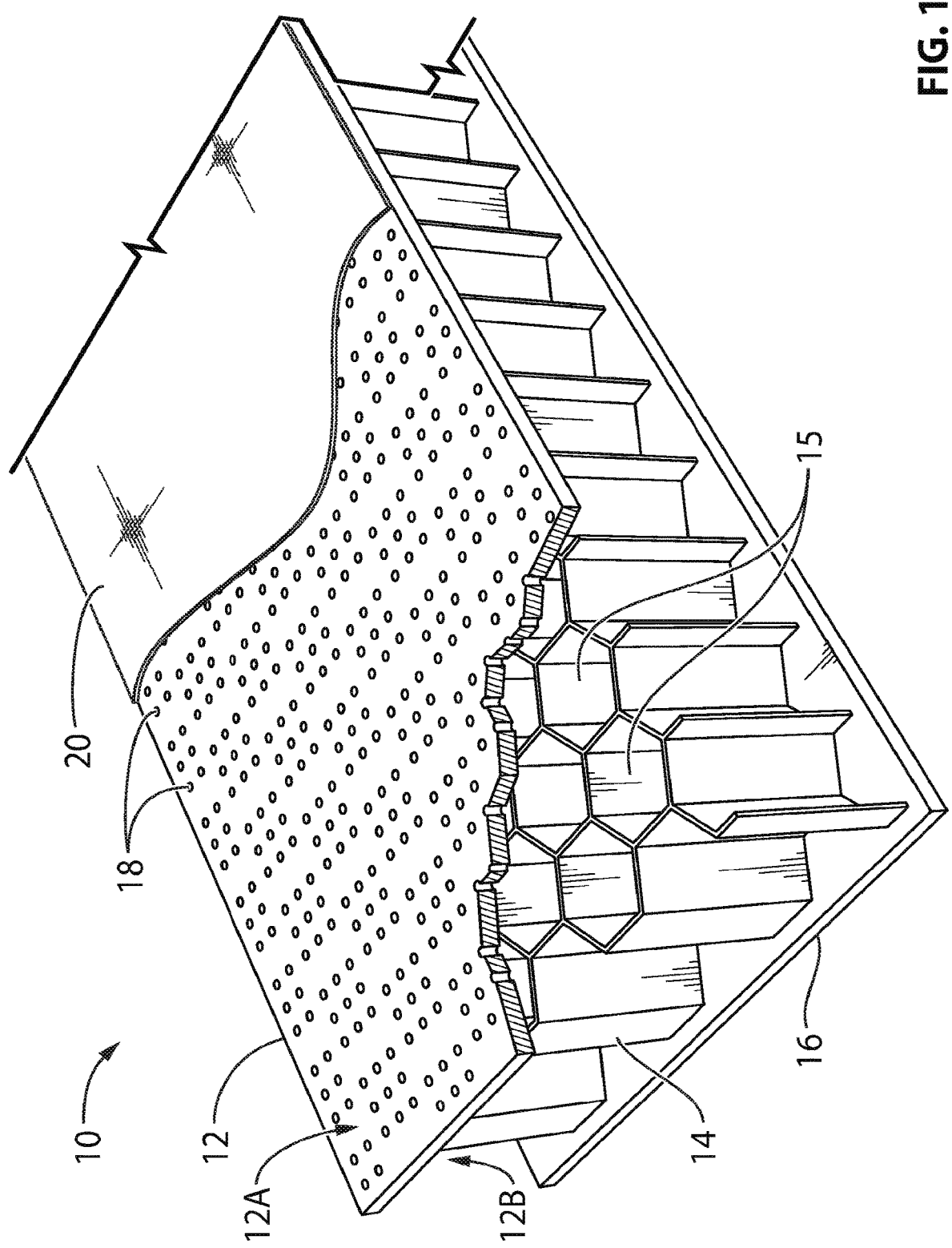
FIG. 1 is a partial perspective view including a cutaway portion of an exemplary noise attenuating device.

The present disclosure relates to manufacturing noise attenuating devices sometimes referred to as "acoustic liners" or "acoustic panels" for aircraft and other applications. In various aspects, the present disclosure relates to manufacturing noise attenuating devices that comprise composite materials including carbon fibre, glass fibre and/or natural fibre reinforced structures. Noise attenuating devices such as those referenced herein may be suitable for use in aircraft engines, passenger cabins of aircraft, trains, trucks or other vehicles, structural framework/bodies of aircraft and other vehicles, and in industrial/civil or other applications requiring noise attenuation.

In some embodiments described herein, the manufacturing of perforated (i.e., porous) composite parts such as facing sheets for such noise attenuating devices may comprise the perforation of such facing sheets after a facing sheet has been cured and bonded to a cellular core of the noise attenuating device. Accordingly, in some embodiments, the process of adhesive reticulation that is often used to bond a pre-perforated facing sheet to a cellular core may not be required. However, some aspects of the present disclosure could also be used in conjunction with adhesive reticulation.

Aspects of various embodiments are described through reference to the drawings.

FIG. 10A schematically illustrates an apparatus 100 for automated adhesive reticulation that is typically used to apply an adhesive 102 to the top of the walls 104A (see FIG. 10B) of cellular (e.g., honeycomb) core 104 in preparation for bonding to a pre-perforated facing sheet (not shown in FIG. 10A) for the manufacturing of an acoustic liner structure of a conventional design. The process of automated reticulation comprises positioning an unsupported adhesive 102 in the form of a film on top of honeycomb core 104 and using a preheat lamp 106 positioned on a moving gantry to pass over the unsupported adhesive 102, heat and tack film adhesive 102 to the top edges of the walls 104A (see FIG. 10B) of honeycomb core 104. Air knife 108, also attached to the same gantry, blows hot air up through the cells 105 (see FIG. 10B) of the honeycomb core 104 and causes the film adhesive 102 to bubble up to a point of low integrity, burst, and then collect at the top edges of walls 104A of honeycomb core 104. Apparatus 100 may also comprise fume hood 110, which may be attached to and move with the same gantry. After the reticulation process, the pre-perforated facing sheet and honeycomb core 104 may be joined and adhesively bonded together at the top edges of walls 104A of honeycomb core 104 with the adhesive 102 that has collected at the top edges of walls 104A. Reticulation may be used for bonding of honeycomb core 104 to a facing skin and also for the bonding of a septum between two honeycomb cores 104.

FIG. 10B is a cross-section view of cellular core 104 comprising adhesive 102 that has been applied to the top edges of walls 104A using the reticulation process described above. Cellular core 104 of FIG. 10B is shown in a state where adhesive 102 has collected at the top edges of walls 104A and where cellular core 104 is ready to be bonded to a pre-perforated facing sheet or to some other component of an associated noise attenuating device.

In the case of bonding the pre-perforated facing sheet to honeycomb core 104, given that the adhesive bead 102 is concentrated at or near the top of walls 104A of honeycomb core 104, there is the possibility that some of the adhesive 102 may leak/run onto other components of the noise attenuating device and also that some of the adhesive 102 may enter and at least partially occlude some of the holes that have already been formed in the pre-perforated facing sheet and consequently affect the performance of the resulting noise attenuation device.

More details on the reticulation of an adhesive film and examples of noise attenuation devices that are manufactured using such reticulation process are provided in U.S. Pat. No. 6,371,242, which is incorporated herein by reference in its entirety.

FIG. 1 is a partial perspective view including a cutaway portion of an exemplary noise attenuating device 10 according to the present disclosure. In some embodiments, noise attenuating device 10 may be manufactured according to the methods disclosed herein which may not require the use of adhesive reticulation described above in relation to FIGS. 10A and 10B. Accordingly, in some situations, methods disclosed herein may provide better acoustic performance for a given perforated (open) area and improved repeatability. However, in some embodiments, aspects of this disclosure could be used in conjunction with adhesive reticulation to manufacture noise attenuating device 10.

Noise attenuating device 10 may comprise one or more perforated facing sheets 12 (referred hereinafter as "facing sheet 12"), one or more honeycomb or other cellular cores 14 (referred hereinafter as "cellular core 14") and one or more sound reflecting backing plates 16 (referred hereinafter as "backing plate 16"). Cellular core 14 may be of any known or other type suitable for use in noise attenuation device 10 the type disclosed herein and its selection may be dependent on the specific application for noise attenuating device 10. In some embodiments, cellular core 14 may have a honeycomb configuration. For example, cellular core 14 may comprise an aramid-fiber reinforced honeycomb sold under the trade name NOMEX® by HEXCEL COMPOSITES.

Cellular core 14 may be bonded between facing sheet 12 and backing plate 16. For the purpose of the present disclosure, the term "bonded" is intended to encompass "joined securely" as with a suitable adhesive or other suitable means of joining cellular core 14 to facing sheet 12 and/or to backing plate 16. It is understood that the term "bonded" may encompass direct joining or indirect joining of components via one or more intermediate components.

Cellular core 14 may partition the space between facing sheet 12 and backing plate 16 into a plurality of cells 15. Depending on the shape and configuration of noise attenuation device 10, walls defining cells 15 may be generally perpendicular to facing sheet 12. Facing sheet 12 may comprise one or more holes 18 extending therethrough. The number, size, shape and spacing of holes 18 may be selected according to known or other methods to establish desired acoustic performance of noise attenuating device 10. In some embodiments, holes 18 may be selected so that between about 5% to about 12% of the surface area of facing sheet 12 is perforated. In some embodiments, holes 18 may be selected so that between about 4% to about 10% of the surface area of facing sheet 12 is perforated. In some embodiments, holes 18 may be selected so that between about 5% to about 20% of the surface area of facing sheet 12 is perforated. In some embodiments, holes 18 may be selected so that up to about 33% of the surface area of facing sheet 12 is perforated. In some embodiments, holes 18 may be selected so that between about 3% to about 35% of the surface area of facing sheet 12 is perforated. Facing sheet 12 may comprise outer side 12A facing outwardly from noise attenuating device 10 (e.g., toward a source of noise) and inner side 12B facing cellular core 14. In some embodiments, backing plate 16 may also be perforated to allow the passage of heated air for anti-icing purposes.

During use, facing sheet 12 may be facing a source of noise and attenuation of the sound waves that impinge facing sheet 12 may occur according to a number of mechanisms such as: energy loss due to friction when the sound waves penetrate facing sheet 12 through holes 18; pressure loss when the sound waves expand into cells 15; and reactive cancellation of a sound wave entering and travelling in cell 15 by a previous sound wave that has been reflected and is returning from backing plate 16. In some embodiments, the depth of cells 15 (i.e., thickness of core 14) may be selected (i.e., tuned) to attenuate a desired frequency or range of sound frequencies. In some embodiments, a plurality of holes 18 may be in communication with each of cells 15 and each cell 15 may function as a Helmholtz resonant cavity.

Noise attenuating devices 10 having the construction shown in FIG. 1 may be suitable for use in aircraft engines. For example, noise attenuating device 10 may be suitable for installation in a nacelle or other part of an aircraft engine. For example, noise attenuating device 10 may be disposed in selected positions within flow ducts of an aircraft engine. Such flow duct(s) may comprise the inlet duct, fan duct and/or the nozzle assembly of a nacelle. For example, noise attenuating device 10 may be used as a lip acoustic liner/panel or an inlet acoustic liner/panel. Noise attenuating device 10 may be part of a single-piece or multi-piece acoustic liner/panel having a generally linear or curved configuration. For example noise attenuating device 10 may be part of a single-piece or a multi-piece annular-shaped acoustic liner/panel for installation into a nacelle of an aircraft engine and comprising a noise attenuation region that extends substantially 360 degrees about a central axis.

Noise attenuating device 10 shown in FIG. 1 may comprise a single degree of freedom acoustic liner/panel but aspects of the present application are equally applicable to double degree of freedom acoustic liners/panels not specifically shown herein. For example in a double degree of freedom acoustic liner/panel, perforated facing sheet 12 may be backed by two layers of cellular core 14 that are separated from each other via a perforated septum sheet (not shown).

The acoustic performance of noise attenuating device 10 may be highly dependent on its construction including the specification of holes 18 and also on the depth of cells 15 in cellular core 14. Generally, noise attenuating devices 10 of the types referenced herein can be designed to be most effective to reduce the effective perceived noise level and accordingly the thickness of the cellular core 14 (i.e., the space between facing sheet 12 and backing plate 16) may be about 1-2 inches (25-50 mm).

Noise attenuating device 10 may be of the "linear" acoustic liner type and may include a porous layer 20 that may be adhesively bonded to facing sheet 12. In some embodiments, porous layer 20 may comprise a woven wire cloth or mesh. The porosity of the mesh (and consequently the acoustic response) may be adjusted by selection of wire diameter, spacing and weave style to produce desired properties. In various embodiments, porous layer 20 may comprise fibers such as carbon, fiberglass, thermoplastic, metallic (e.g., stainless steel), carbon multi-walled and/or single-walled nanotubes arranged in the form of randomly oriented fibres, aligned veil or mat, various two-dimensional weaves and porous paper (e.g., buckypaper) for example. The use of porous layer 20 may provide a substantially linear response which may be suitable for noise attenuation in aircraft applications.

It is understood that aspects of the present disclosure are equally applicable to noise attenuation devices 10 of different configurations than that of FIG. 1. For example, aspects of the present disclosure could be used in conjunction with "simple perforate" acoustic liner structures and/or "double layer linear" acoustic liner structures.

Figure 2:
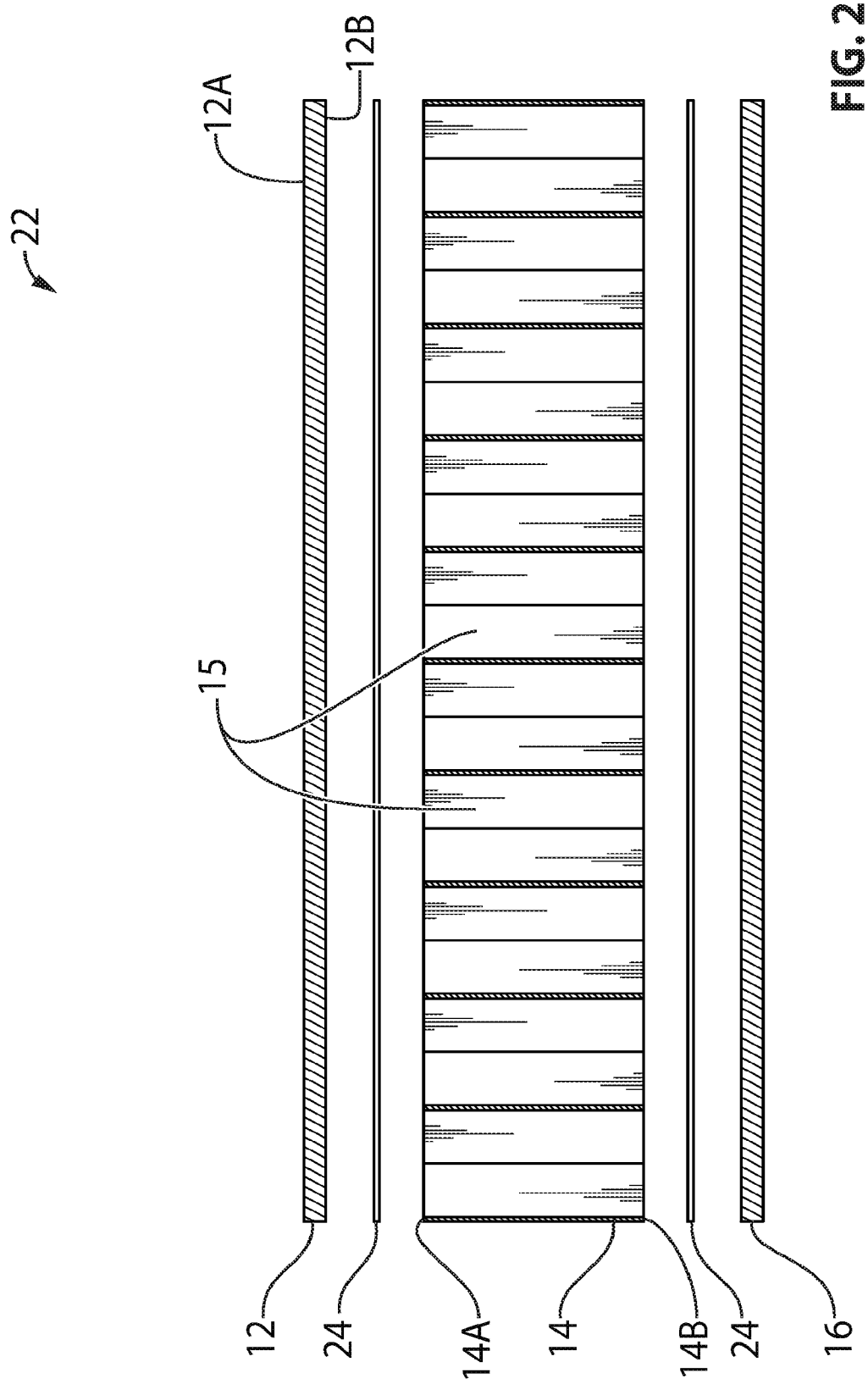
FIG. 2 is a schematic cross-sectional and exploded view of an exemplary precursor used in the manufacturing of the noise attenuating device of FIG. 1.

FIG. 2 is a schematic cross-sectional and exploded representation of an exemplary precursor 22 used in the manufacturing of noise attenuating device 10 of FIG. 1. The term "precursor" as used herein is intended to encompass a component or an assembly of components that is used in the manufacturing of a final part such as noise attenuating device 10 but that is at a (e.g., pre-final) stage in the manufacturing process that precedes the final part. For example, precursor 22 may comprise cellular core 14 and imperforated facing sheet 12 being bonded to first side 14A of cellular core 14 so that inner side 12B of imperforated facing sheet 12 faces first side 14A of the cellular core. Imperforated facing sheet 12 of precursor 22 may be a composite laminate comprising an assembly of layers of fibrous composite material(s) joined together in a matrix material to provide the desired engineering properties. In some embodiments, facing sheet 12 may be pre-cured before it is bonded to cellular core 14 adhesively or otherwise. Alternatively, facing sheet 12 may be made of a metallic material such as an aluminum alloy for example.

Precursor 22 shown in FIG. 2 is at a manufacturing stage where facing sheet 12 has already been bonded to cellular core 14 via one or more adhesive films (referred hereinafter as "adhesive film 24") but has not yet been perforated. Accordingly, the adhesive bonding of imperforated facing sheet 12 to cellular core 14 may be conducted by applying adhesive film 24 to inner side 12B of facing sheet 12 and then joining facing sheet 12 to cellular core 14. Adhesive film 24 may be epoxy based. Adhesive film 24 may be unsupported or supported by a relatively fine mesh serving to hold the epoxy. Adhesive film 24 may have a relatively uniform thickness. Examples of adhesive film 24 that may be suitable in various embodiments may include: product number FM 300M sold under the trade name CYTEC; product number Redux 319 sold under the trade name HEXCEL; and product numbers Hysol EA 9695 and PL795-1 sold under the trade name HENKEL.

In some situations where an unsupported adhesive film 24 is used to bond facing sheet 12 and cellular core 14 by way of adhesive reticulation for example, the composition of such unsupported adhesive film 24 could be modified by including a rubber additive or a nano-material additive to toughen adhesive film 24 and increase its resistance to abrasive blasting. Such modification could provide some protection of the underlying cellular core 14 during the perforation of facing sheet 12 by abrasive blasting.

It is understood that facing sheet 12 may be directly or indirectly bonded to cellular core 14. For example, in some embodiments, one or more intermediate components or layers could be disposed between facing sheet 12 and cellular core 14. Nevertheless, in some embodiments adhesive film 24 in combination with imperforated facing sheet 12 may be used instead of the adhesive reticulation process described above for the bonding of facing sheet 12 to cellular core 14. Furthermore, since facing sheet 12 is not perforated during the bonding process and the holes 18 are formed through facing sheet 12 only after the bonding process, the risk of adhesive from adhesive film 24 flowing into and occluding some of holes 18 is substantially eliminated.

In some embodiments, precursor 22 may comprise backing plate 16 bonded to second side 14B of cellular core 14 where second side 14B is opposite to first side 14A. In some embodiments, backing plate 16 may also be adhesively bonded to cellular core 14 via one or more adhesive films 24. Backing plate 16 may be bonded to cellular core 14 before perforation of holes 18. In some embodiments, backing plate 16 may not be adhesively bonded to cellular core 14 until after perforation of holes 18 in facing sheet 12.

In some embodiments, adhesive film 24 disposed on inner side 12B of imperforated facing sheet 12 may uniformly cover a region of inner side 12B of facing sheet 12 where the region has an area that covers (i.e., spans across and overlays) the cross-sectional length and width of one or more cells 15 of cellular core 14. In some embodiments, adhesive film 24 disposed on inner side 12B of imperforated facing sheet 12 may substantially and uniformly cover a region of inner side 12B of facing sheet 12 overlaying all cells 15 of cellular core 14 covered by imperforated facing sheet 12. In any case, since facing sheet 12 is bonded to cellular core 14 prior to being perforated, holes 18 subsequently formed through facing sheet 12 may also extend through adhesive film 24.

Figure 3:
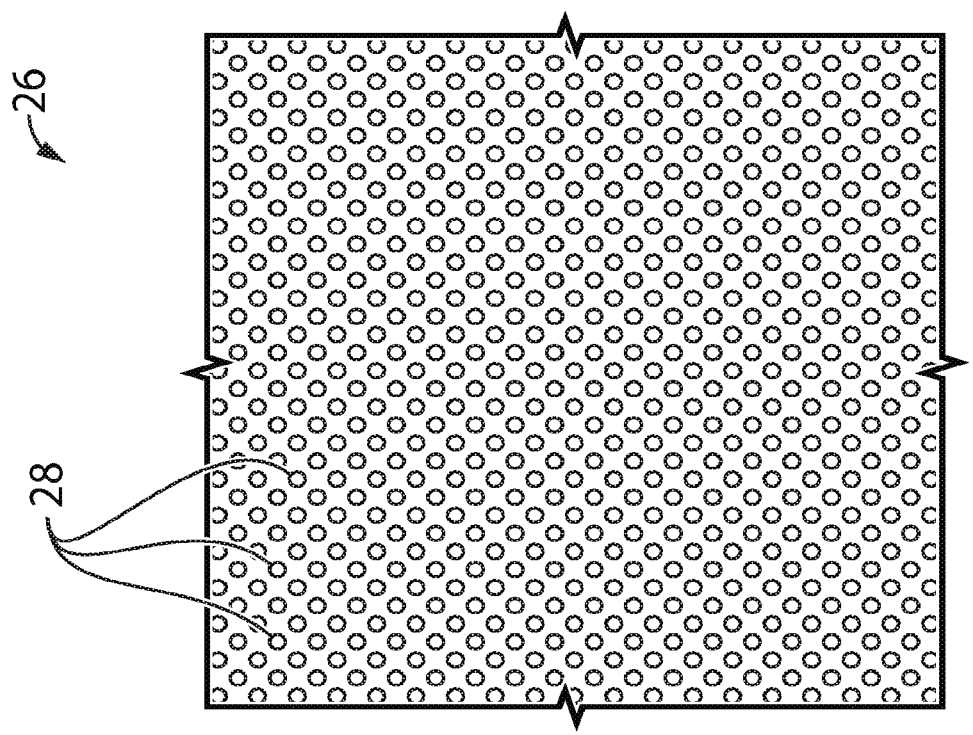
FIG. 3 is a top plan view of an exemplary mask for use during the forming of holes through a facing sheet of the noise attenuating device of FIG. 1 using abrasive blasting.

FIG. 3 is a top plan view of an exemplary mask 26 (sometimes known as "stencil") for use during the forming of holes 18 through imperforated facing sheet 12 of precursor 22 of FIG. 2 using abrasive blasting. Abrasive blasting, also referred to as "grit blasting" is the operation of forcibly propelling a stream of abrasive material (e.g., particles) against a surface under high pressure to smooth a rough surface, roughen a smooth surface, shape a surface, or remove surface contaminants. In the case of the present disclosure, abrasive blasting may be used to perforate holes 18 through facing sheet 12 by abrasion of material of facing sheet 12 at desired locations. It is understood that, in various aspects, methods disclosed herein are not limited to abrasive blasting and other perforation methods such as conventional (e.g., multi-spindle) mechanical drilling and laser drilling could be used in the disclosed methods for manufacturing noise attenuating device 10 depending on, for example, the material of facing sheet 12.

With respect to abrasive blasting, mask 26 may be disposed on (e.g., removably adhered to) outer side 12A of facing sheet 12 of precursor 22 and may be considered part of precursor 22 in some embodiments. Mask 26 may comprise a sheet of material having some resistance to abrasive blasting. Mask 26 may comprise a plurality of holes 28 formed therein to permit the passage of abrasive material 30 (shown in FIG. 4) therethrough at locations where facing sheet 12 is to be perforated by abrasive blasting. In various embodiments, the material of mask 26 may be polyurethane, vinyl or the like. The material of mask 26 may have some resistance to the force of the intended abrasive blast and remain as an integral sheet so that it can be adhered to the workpiece (e.g., facing sheet 12) prior to abrasive blasting, remain intimately adhered to the workpiece during abrasive blasting and removed from the workpiece after the perforating of the workpiece according to the hole pattern of mask 26 is completed. In some embodiments, mask 26 may be of the type disclosed in U.S. Pat. No. 5,066,450, which is incorporated herein by reference. In some embodiments, mask 26 may comprise a photosensitive material. In some embodiments, mask 26 may be of the type known as a photo-resist film sold under the trade name IKONICS. In some embodiments, mask 26 may be produced from a photo-resist laminate including a photo-imageable layer.

Figure 4:
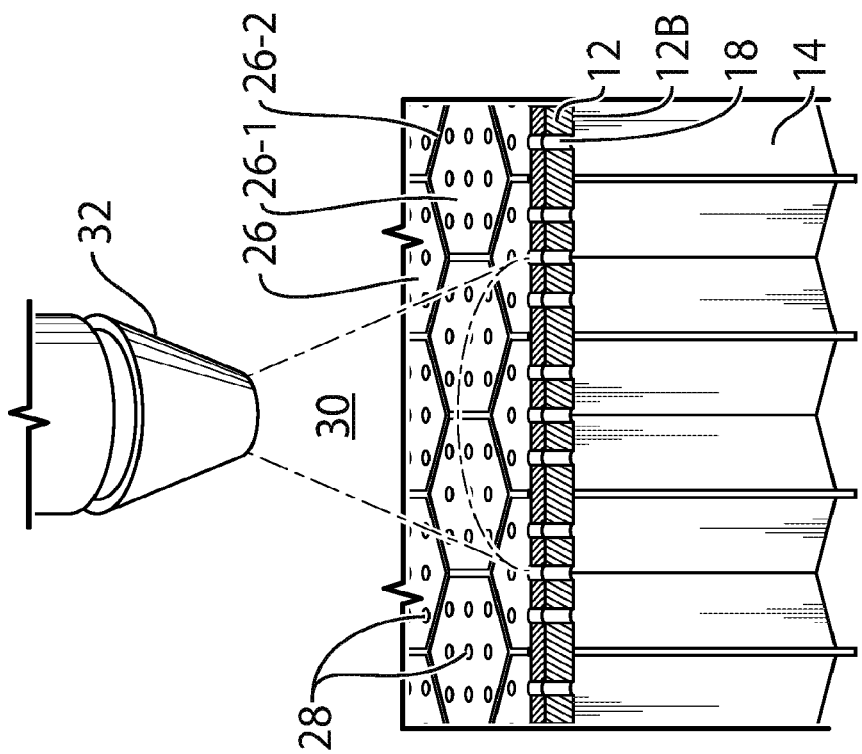
FIG. 4 is a schematic representation of abrasive blasting of a facing sheet of the noise attenuating device of FIG. 1 using a mask that permits abrasive blasting of walls of a cellular core.

FIG. 4 is a schematic representation of abrasive blasting of facing sheet 12 of precursor 22 during the manufacturing of noise attenuating device 10 of FIG. 1 using mask 26 configured to permit the abrasive blasting of one or more walls of cellular core 14. Mask 26 may comprise holes 28 through which abrasive material 30 delivered from nozzle 32 may pass during the formation of holes 18 in facing sheet 12. Mask 26 may overlay outer side 12A of facing sheet 12 and may be configured to substantially prevent abrasive blasting of facing sheet 12 at locations where facing sheet 12 is to remain imperforated.

As illustrated in FIG. 4, mask 26 may comprise an arrangement of holes 28 that does not take into consideration (i.e., that ignores) the locations of the walls of cellular core 14. Accordingly, one or more holes 28 in facing sheet 12 may end up at a position overlapping (i.e., at least partially aligned with) one or more walls of cellular core 14. Consequently, in some embodiments, one or more walls of cellular core 14 may also be abraded by abrasive material 30 passing through holes 28 and 18 during perforation. In some embodiments, the abrasion of one or more walls of cellular core 14 may not significantly affect the structural integrity and/or acoustic performance of the resulting noise attenuation device 10 and may therefore be acceptable. However, is some embodiments, it may be desirable that mask 26 be configured to avoid abrasive blasting (damaging) the walls of cellular core 14 as explained below.

Figure 5:
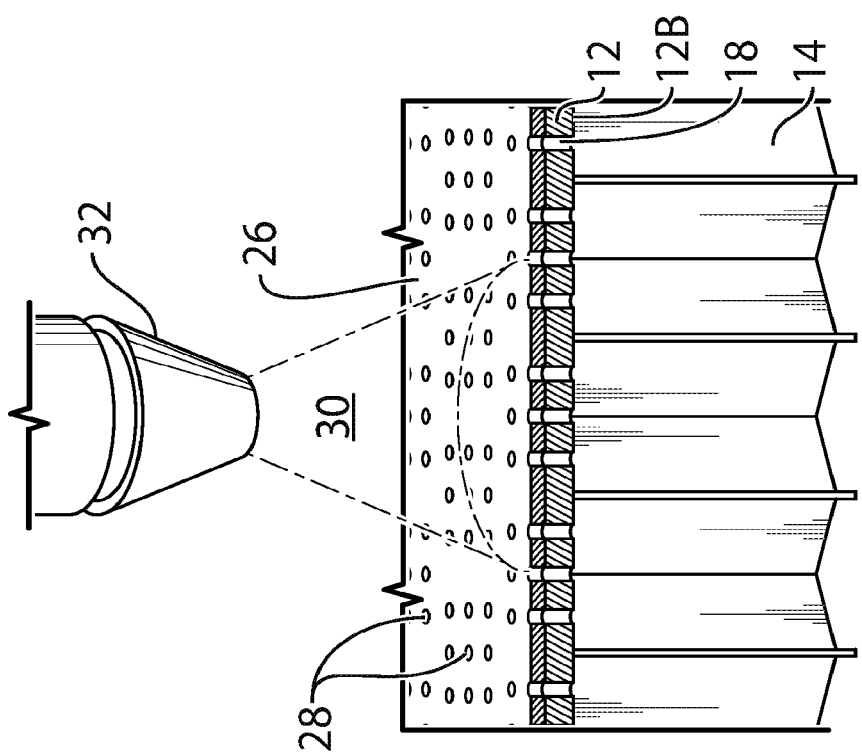
FIG. 5 is a schematic representation of abrasive blasting of a facing sheet of the noise attenuating device of FIG. 1 using a mask that permits the perforation of the facing sheet while substantially preventing the abrasive blasting of walls of a cellular core.

FIG. 5 is a schematic representation of abrasive blasting of facing sheet 12 of precursor 22 during the manufacturing of noise attenuating device 10 of FIG. 1 using mask 26 taking into consideration the locations of the walls of cellular core 14 in order to substantially prevent the abrasive blasting of walls of cellular core 14. For example, in some embodiments, mask 26 may be configured to substantially prevent abrasive blasting of facing sheet 12 at locations of facing sheet 12 that overlap some or any (i.e., all) walls of cellular core 14 so as to prevent abrading of the walls of cellular core 14 after holes 18 have pierced through facing sheet 12 and abrasive material 30 is permitted to pass through facing sheet 12. In such embodiments, holes 28 through mask 26 may be arranged so as to leave regions of mask 26 above the walls of cellular core 14 free of holes 28. Also, mask 26 may be appropriately aligned on facing sheet 12 so that the wall-masking regions provided in mask 26 may be positioned on facing sheet 12 so as to cover portions of facing sheet 12 overlapping the walls of cellular core 14.

In various embodiments, mask 26 may comprise only a single mask portion 26-1 in which holes 28 are arranged to avoid the walls of cellular core 14, or, alternatively, the avoidance of the walls of cellular core 14 may be achieved by way of one or more first mask portions 26-1 and one or more second mask portions 26-2. First mask portion 26-1 may be configured to overlay outer side 12A of facing sheet 12 and may comprise a plurality of holes 28 configured to permit passage of abrasive material 30 through first mask portion 26-1 to perforate facing sheet 12. Second mask portion 26-2 may be configured to block one or more of the plurality of holes 28 formed in first mask portion 26-1 that overlap walls of cellular core 14 in order to substantially prevent the walls of cellular core 14 from being abrasively blasted. In some embodiments, mask portions 26-1 and 26-2 may comprise distinct masking films/layers that are superimposed. For example, as shown in the embodiment of FIG. 5, second mask portion 26-2 may overlay first mask portion 26-1.

Whether the avoidance of the walls of cellular core 14 is achieved via the arrangement of holes 28 in first mask portion 26-1 or via the use of second mask portion 26-2 to block some of holes 28 in first mask portion 26-1, mask 26 may require to be properly positioned relative to cellular core 14. In some embodiments as described further below, holes 28 through mask 26 may be produced while mask 26 is disposed on facing sheet 12. Alternatively, holes 28 through mask 26 may be produced before placing mask 26 on facing sheet 12 and mask 26 may then be positioned on facing sheet 12 using any suitable known or other methods. In some embodiments, an image outlining the walls of cellular core 14 may be projected onto outer side 12A of facing sheet 12 so as to permit manual/visual alignment of mask 26 with such image when mask 26 is installed on facing sheet 12. Such image 26 may be an expected outline of the walls based on the type of cellular core 14 used or may be obtained by non-destructive (e.g., x-ray, thermography) imaging of the actual precursor 22 and may represent the actual positions of the walls of cellular core 14. In any case, the projection of the image may be done in relation to one or more reference points or features on precursor 22.

Figure 6:
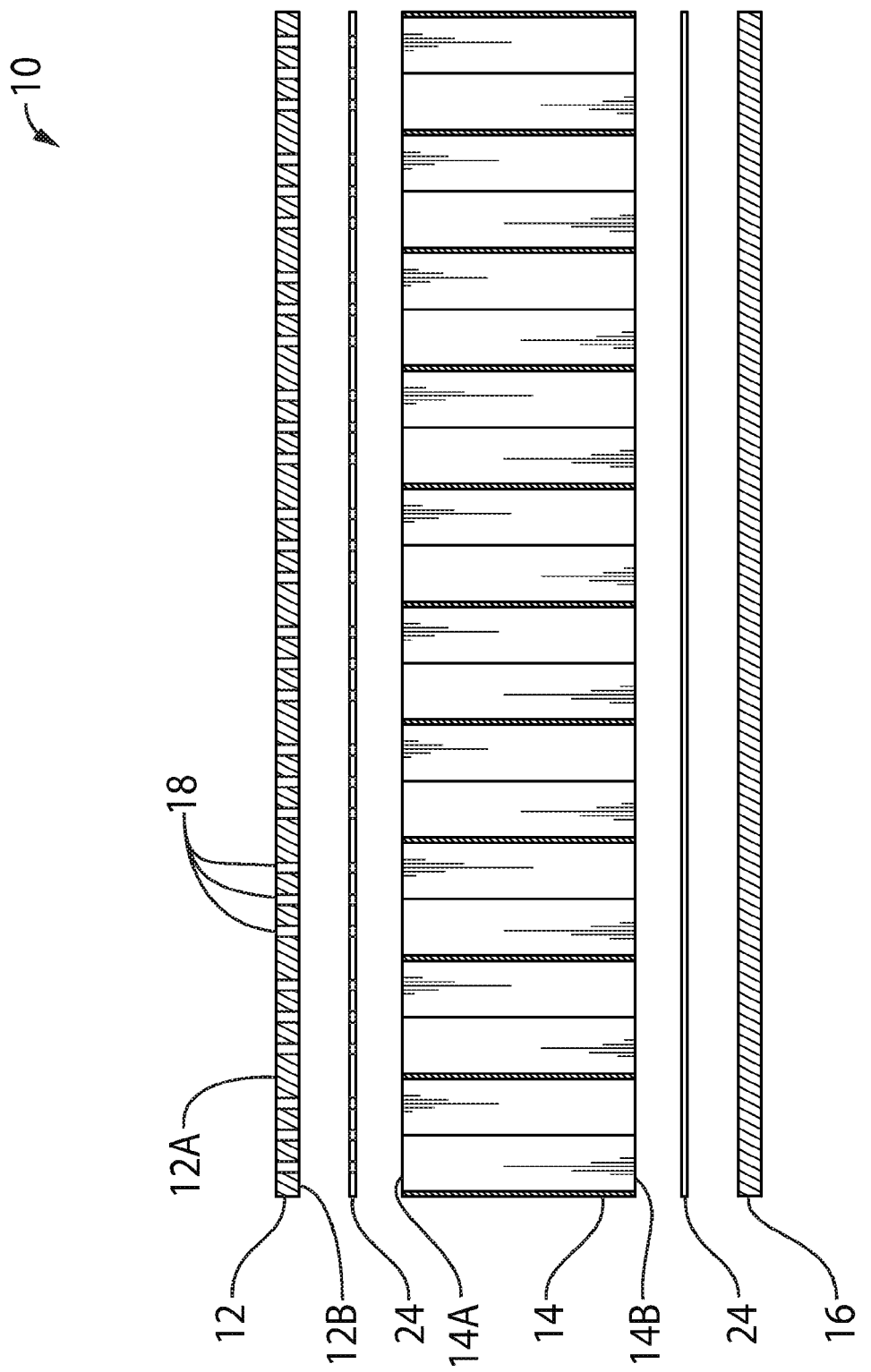
FIG. 6 is a schematic exploded cross-sectional view of an exemplary noise attenuating device.

FIG. 6 is a schematic exploded cross-sectional view of an exemplary noise attenuating device 10 of the type shown in FIG. 1 and made in accordance with the methods disclosed herein. Noise attenuating device 10 of FIG. 6 may have a "simple perforate" acoustic liner structure or may be of other type and therefore may comprise additional components not shown in FIG. 6. For example, noise attenuating device of FIG. 6 may also include porous layer 20 bonded to outer side 12A of facing sheet 12 as shown in FIG. 1 but which has been omitted from FIG. 6 for the sake of clarity. Noise attenuating device 10 may comprise cellular core 14, perforated facing sheet 12 and adhesive film 24 disposed between cellular core 14 and perforated facing sheet 12. Perforated facing sheet 12 may have outer side 12A and inner side 12B where perforated facing sheet 12 may be bonded to first side 14A of cellular core 14 so that inner side 12B of facing sheet 12 faces first side 14A of cellular core 14. Adhesive film 24 may be disposed on inner side 12B of facing sheet 12. Since perforation of facing sheet 12 was conducted after bonding of facing sheet 12 and cellular core 14, the one or more holes 18 extending through perforated facing sheet 12 may also extend through adhesive film 24.

Adhesive film 24 may substantially uniformly cover a region of inner side 12B of facing sheet 12 where the region covers (i.e., spans across and overlays) the cross-sectional length and width one or more cells 15 of cellular core 14. Depending on which type of mask 26 is used during the perforation of holes 18 using abrasive blasting, facing sheet 12 may be imperforated at locations of facing sheet 12 overlapping some or any (i.e., all) walls of cellular core 14.

Noise attenuating device 10 may also comprise backing plate 16 bonded to second side 14B of cellular core 14 where second side 14B of cellular core 14 is opposite first side 14A of cellular core 14. Backing plate 16 may be adhesively bonded to cellular core 14 via the same or other type of adhesive film 24.

Noise attenuating device 10 may be integrated into an airframe structure, an aircraft engine (e.g., nacelle) or in any other suitable component.

Figure 7:
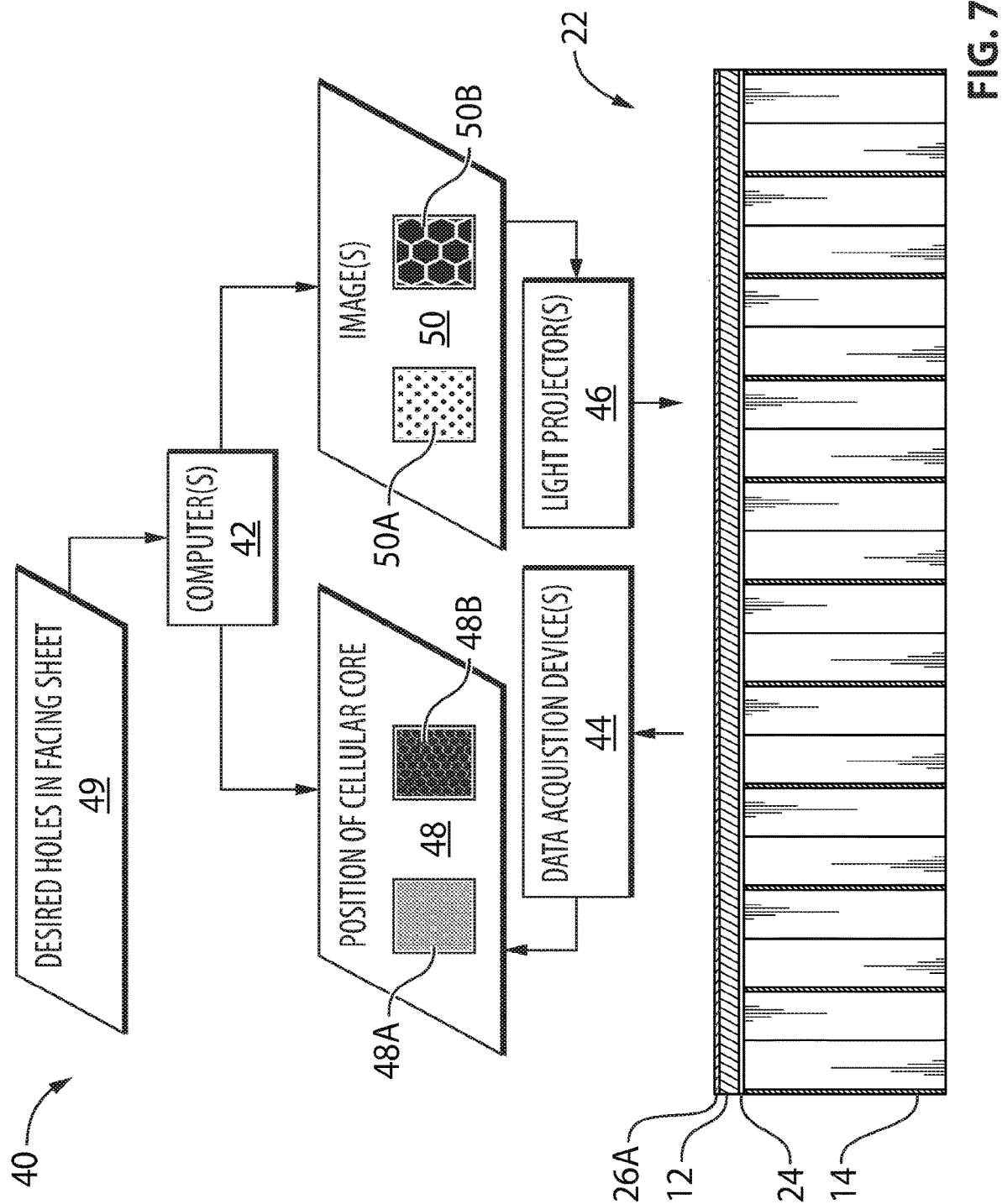
FIG. 7 is a schematic representation of an exemplary system for producing an abrasive blasting mask for use during the perforation of the facing sheet of FIG. 1.

FIG. 7 is a schematic representation of an exemplary system 40 for producing abrasive blasting mask 26 for use during the perforation of facing sheet 12 using a photosensitive masking material 26A. System 40 may comprise one or more computers 42 (referred hereinafter as "computer 42"), one or more data acquisition devices 44 (referred hereinafter as "data acquisition device 44") and one or more light projectors 46 (referred hereinafter as "projector 46").

Computer 42 may comprise one or more processors, a data storage system (including volatile memory or non-volatile memory or other data storage elements or a combination thereof), and at least one communication interface. In some embodiments, computer 42 may be a general purpose computer. The data storage system may comprise a non-transitory computer readable storage medium containing computer program instructions configured to implement one or more functions of one or more methods disclosed herein. For example, the computer program instructions may be configured to at least partially control the operation of projector 46 based on data 48 acquired via data acquisition device 44. For example, in some embodiments, the computer program instructions may be configured to permit computer 42 to perform image processing in order to extract relevant information from data 48 and generate data 50 for controlling the output of projector 46.

Data acquisition device 44 and projector 46 may each be operatively coupled to computer 42 via wired or wireless connections to permit data transfer between computer 42 and each of data acquisition device 44 and projector 46. In various embodiments, data acquisition device 44 may comprise a non-destructive inspection device configured to acquire data 48 representative of the position of at least part of the cellular core 14. For example, data acquisition device 44 may comprise a thermography device of known or other type configured to acquire thermographic image 48A of precursor 22 comprising cellular core 14. Alternatively or in addition, data acquisition device 44 may comprise an X-ray imaging device of known or other type configured to acquire X-ray image 48B of precursor 22 comprising cellular core 14. The computer program instructions may be configured to evaluate data 48 (e.g., thermographic image 48A and/or X-ray image 48B) in order to extract information about the structure (e.g., location of walls of cells 15) of cellular core 14 that has already been bonded to the inner side 12B (see FIG. 1) of facing sheet 12 via adhesive film 24.

Based on data 48 representative of the structure of cellular core 14 and on data representative of one or more holes 18 desired in facing sheet 12, computer 42 may be configured to generate data 50 representative of one or more images 50A, 50B for exposing photosensitive masking material 26A (e.g., film) disposed on (e.g., adhesively bonded to) outer side 12A (see FIG. 1) of facing sheet 12 using projector 46. Projector 46 may comprise any suitable source of light of known or other type configured to selectively expose masking material 26A to light having a wavelength suitable for the activation (i.e., curing) of masking material 26A. For example, in some embodiments, projector 46 may be a laser projection system sold under the trade name VIRTEK and configured to produce light suitable for causing activation of masking material 26A.

In some embodiments, the one or more images may comprise first image 50A incorporating data representative of the one or more holes 18 desired in the facing sheet 12, and, second image 50B incorporating data 48 representative of the position of at least part of cellular core 14. In some embodiments, second image 50B may be a new image derived from data 48. In some embodiments, second image 50B may be one of images 48A or 48B in a modified or original form. For example some sharpening, color changes or known or other image processing operation(s) may be performed on image 48A or 48B to produce an image 50 suitable to obtain the desired exposure of photosensitive masking material 26A using projector 46.

In various embodiments, images 50A and 50B may be projected by projector 46 either sequentially or simultaneously. For example, masking material 26A may be exposed in a first instance for the purpose of producing holes 28 (see FIG. 3) in masking material 26A and in a second instance for the purpose of removing holes 28 that overlap the structure (e.g., cell walls) of cellular core 14. Alternatively, both images 50A and 50B may be combined to form a single image to be projected by projector 46 so as to cause the formation of one or more holes 28 in photosensitive masking material 26A in a region not overlapping the structure of the cellular core and substantially avoid the formation of holes 28 in photosensitive masking material 26A in a region overlapping the structure of the cellular core. Positional registration of data acquisition device 44 and projector 46 may be required so that image(s) 50 projected by projector 46 may be correlated to data 48 representative of the position of cellular core 14.

Photosensitive masking material 26A may be of the type where regions exposed to an appropriate light for an appropriate amount of time are retained and regions that are not exposed to the appropriate light are removed to form mask 26. Accordingly, the white portions of images 50A and 50B represent regions that are exposed to the appropriate light and the black portions of images 50A and 50B represent regions that are not exposed to the appropriate light. Alternatively, masking material 26A may be of the type where regions exposed to the appropriate light for the appropriate amount of time are removed and regions that are not exposed to the appropriate light are retained. For such masking material 26A, the negative of images 50A and 50B may be projected instead.

Figure 8:
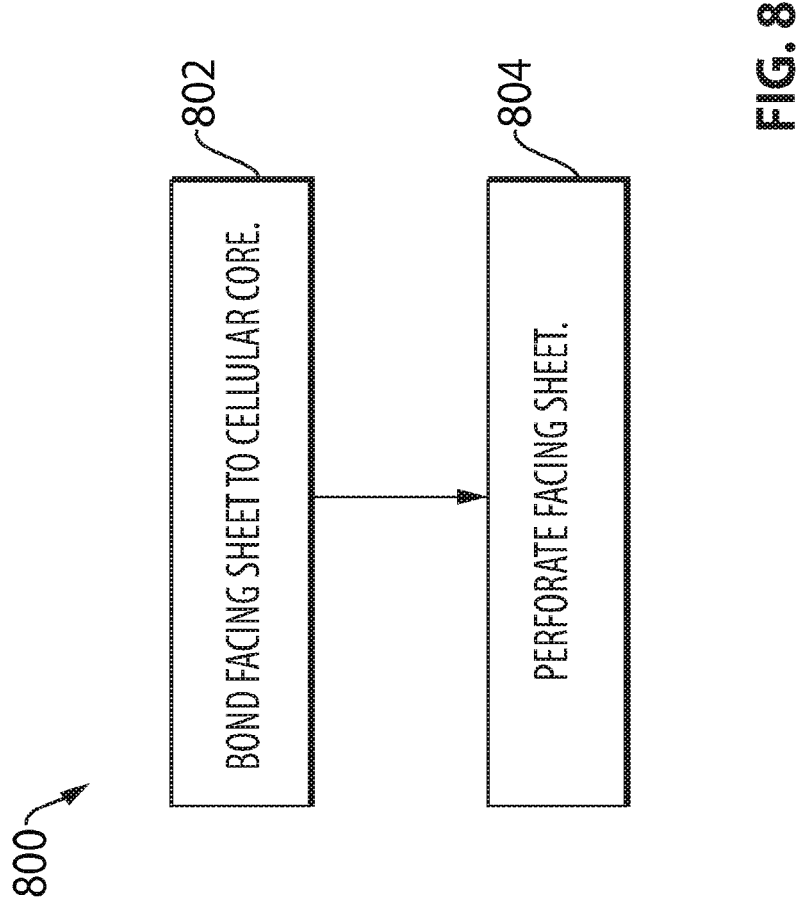
FIG. 8 is a flowchart illustrating an exemplary method for manufacturing the noise-attenuating device of FIG. 1.

FIG. 8 is a flowchart illustrating an exemplary method 800 for manufacturing noise-attenuating device 10. In various embodiments, method 800 may comprise: bonding facing sheet 12 to cellular core 14 so that inner side 12B of facing sheet 12 faces first side 14A of cellular core 14 (see block 802); and after bonding facing sheet 12 to cellular core 14, perforating facing sheet 12 (see block 804).

Method 800 may also comprise bonding backing plate 16 to second side 14B of cellular core 14 before perforating facing sheet 12 where second side 14B of cellular core 14 is opposite first side 14A of cellular core 14.

In some embodiments, bonding facing sheet 12 to cellular core 14 may comprise applying adhesive film 24 to inner side 12B of facing sheet 12 and then joining facing sheet 12 and cellular core 14 using known or other methods (e.g., using predetermined heat and pressure) associated with the type of adhesive film 24. Adhesive film 24 may uniformly cover a region of inner side 12B of facing sheet 12 where the region has an area that covers one or more cells 15 of cellular core 14.

Since the perforation of facing sheet 12 is performed after bonding facing sheet 12 with cellular core 14, method 800 may comprise forming one or more holes 18 through facing sheet 12 as well as through adhesive film 24 when perforating facing sheet 12. As explained above, perforating facing sheet 12 may comprise abrasive blasting facing sheet 12 or any other suitable method of forming holes 18 through facing sheet 12 such as conventional drilling and/or laser drilling.

Method 800 may also comprise masking outer side 12A of facing sheet 12 at locations where facing sheet 12 is to remain imperforated. In some embodiments, this may comprise masking outer side 12A of facing sheet 12 at locations of facing sheet 12 overlapping any walls of cellular core 14 in order to substantially prevent the walls of cellular core 14 from being abrasively blasted during perforation.

Method 800 may also comprise, after perforating facing sheet 12, bonding a layer of porous material (see porous layer 20 of FIG. 1) to outer side 12A of facing sheet 12. Porous layer 20 may be adhesively bonded to outer side 12A of facing sheet 12 via suitable spray adhesive applied to outer side 12A. In some embodiments, method 800 may also comprise perforating backing plate 16 after backing plate 16 has been bonded to cellular core 14 either using abrasive blasting or some other method of perforation.

Method 800 may comprise applying photosensitive masking material 26A on outer side 12A of facing sheet 12 and selectively exposing photosensitive masking material 26A to an appropriate light, using system 40 for example, to cure photosensitive masking material and produce abrasive blasting mask 26. Selectively exposing photosensitive masking material 26A may comprise projecting one or more images 50A, 50B on photosensitive masking material 26A where the one or more images 50A, 50B are configured to cause the formation of one or more holes 28 in photosensitive masking material 26A in a region not overlapping the structure of cellular core 14, and, substantially avoid the formation of holes 28 in photosensitive masking material 26A in a region overlapping a structure of cellular core 14. As explained above, data 48 representative of the structure of cellular core 14 may be used to generate data 50 representative of the one or more images 50A, 50B.

The one or more images 50A, 50B may comprise a single image 50 incorporating both data 48 representative of the position of at least part of cellular core 14 and data 49 representative of one or more holes 18 desired in facing sheet 12A. The single image 50 may define an outline of one or more walls of cellular core 14 and one or more holes 18 desired in the facing sheet 12.

Alternatively, the one or more images 50A, 50B may comprise first image 50A incorporating data representative of one or more holes 18 desired in facing sheet 12, and, second image 50B incorporating data 48 representative of the position of at least part of cellular core 14. Method 800 may comprise projecting first image 50A and second image 50B either sequentially or simultaneously.

In some embodiments, data 48 representative of the position of at least part of cellular core 14 may comprise a thermographic image of precursor 22 comprising cellular core 14. Alternatively or in addition, data 48 representative of the structure of cellular core 14 may comprise an X-ray image of precursor 22 comprising cellular core 14.

FIG. 9 is a flowchart illustrating an exemplary method 900 for producing abrasive blasting mask 26 for use during the perforation of facing sheet 12 of noise attenuating device 10 or some other sheet with an underlying structure. Mask 26 produced according to method 900 may be configured to substantially prevent the abrasive blasting of the underlying structure (e.g., walls of cellular core 14). Method 900 or part(s) thereof may be combined with part(s) of method 800 described above. Method 900 or part(s) thereof may be performed using system 40 described above. Method 900 may comprise: using data 48 representative of the position of the underlying structure (e.g., walls of cellular core 14) and data 49 representative of one or more holes 18 desired in sheet 12, generating data 50 representative of one or more images 50A, 50B for exposing photosensitive masking material 26A disposed on sheet 12 (see block 902). The one or more images 50A, 50B may be configured to cause the formation of one or more holes 28 (see FIG. 3) in photosensitive masking material 26A in a region not overlapping the underlying structure and substantially avoid the formation of holes 28 in photosensitive masking material 26A in a region overlapping the underlying structure. Method 900 may comprise projecting the one or more images 50A, 50B on photosensitive masking material 26A to expose photosensitive masking material 26A and produce abrasive blasting mask 26 for preventing the abrasive blasting of (i.e., protecting) the underlying structure.

In some embodiments, the one or more images 50A, 50B may comprise a single image incorporating both data 48 representative of the position of the underlying structure and data 49 representative of the one or more holes 18 desired in sheet 12. For example, such single image may define an outline of one or more walls of cellular core 14 and one or more holes 18 desired in facing sheet 12.

In some embodiments, the one or more images 50A, 50B may comprise: first image 50A incorporating data 49 representative of one or more holes 18 desired in sheet 12; and second image 50B incorporating data 48 representative of the position of the underlying structure. In some embodiments first image 50A and second image 50B may be projected onto photosensitive masking material 26A sequentially or simultaneously via projector 46 or other means.

In various embodiments of method 900, data 48 representative of the position of the underlying structure may comprise a thermographic image 48A showing the underlying structure. Alternatively or in addition, data 48 representative of the underlying structure may comprise an X-ray image 48B showing the underlying structure.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, blocks may be added, deleted, or modified. The present disclosure may be embodied in other specific forms without departing from the subject matter of the claims. Also, one skilled in the relevant arts will appreciate that while the noise attenuation devices, precursors, masks and methods disclosed and shown herein may comprise a specific number of elements/components, the noise attenuation devices, precursors, masks and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. A method for manufacturing a noise-attenuating device, the method comprising:
   bonding a facing sheet to a cellular core so that an inner side of the facing sheet faces a first side of the cellular core;
   producing an abrasive blasting mask by:
      applying a photosensitive masking material on an outer side of the facing sheet; and
      selectively exposing the photosensitive masking material to light configured to activate the photosensitive masking material, wherein selectively exposing the photosensitive masking material to light comprises projecting one or more images on the photosensitive masking material; and
   after bonding the facing sheet to the cellular core, perforating the facing sheet by abrasive blasting the facing sheet, the one or more images being configured to cause the formation of one or more holes in the photosensitive masking material in a region not overlapping the structure of the cellular core and substantially avoid the formation of holes in the photosensitive masking material in a region overlapping a structure of the cellular core.

2. The method as defined in claim 1, further comprising using data representative of a position of at least part of the cellular core to generate data representative of the one or more images.

3. The method as defined in claim 2, wherein the one or more images comprise a single image incorporating both the data representative of the position of at least part of the cellular core and data representative of one or more holes desired in the facing sheet.

4. The method as defined in claim 3, wherein the single image defines an outline of one or more walls of the cellular core and the one or more holes desired in the facing sheet.

5. The method as defined in claim 2, wherein the one or more images comprise:
   a first image incorporating data representative of one or more holes desired in the facing sheet; and
   a second image incorporating the data representative of the position of at least part of the cellular core.

6. The method as defined in claim 5, further comprising projecting the first image and the second image sequentially.

7. The method as defined in claim 2, wherein the data representative of the position of at least part of the cellular core comprises a thermographic image of a precursor to the noise attenuating device comprising the cellular core.

8. The method as defined in claim 2, wherein the data representative of the position of at least part of the cellular core comprises an X-ray image of a precursor to the noise attenuating device comprising the cellular core.

9. A method for manufacturing a noise-attenuating device, the method comprising:
   laying up a plurality of layers of fibrous composite material;
   joining together the plurality of layers of fibrous composite material in a matrix material to form a facing sheet;
   bonding the facing sheet to a cellular core so that an inner side of the facing sheet faces a first side of the cellular core;
   producing an abrasive blasting mask by:
      applying a photosensitive masking material on an outer side of the facing sheet; and
      selectively exposing the photosensitive masking material to light configured to activate the photosensitive masking material, wherein selectively exposing the photosensitive masking material to light comprises projecting one or more images on the photosensitive masking material; and
   after bonding the facing sheet to the cellular core, perforating the facing sheet by abrasive blasting the facing sheet, the one or more images being configured to cause the formation of one or more holes in the photosensitive masking material in a region not overlapping the structure of the cellular core and substantially avoid the formation of holes in the photosensitive masking material in a region overlapping a structure of the cellular core.

10. The method as defined in claim 9, further comprising the step of pre-curing the facing sheet before the bonding step.

11. The method as defined in claim 9, the step of bonding the facing sheet to the cellular core including applying adhesive film to the facing sheet and joining the facing sheet to the cellular core.

12. The method as defined in claim 11, the step of bonding the facing sheet to the cellular core including toughening the adhesive film via rubber additive or nano-material additive.

13. A precursor for manufacturing a noise attenuating device, the precursor comprising:
   a cellular core having a first side;
   an imperforated facing sheet having an outer side and an inner side, the imperforated facing sheet being bonded to the first side of the cellular core so that the inner side of the facing sheet faces the first side of the cellular core; and
   a mask overlaying the outer side of the facing sheet and configured to substantially prevent abrasive blasting of the facing sheet at locations where the facing sheet is to remain imperforated, the mask being produced by:
      applying a photosensitive masking material on an outer side of the facing sheet; and
   selectively exposing the photosensitive masking material to light configured to activate the photosensitive masking material, wherein selectively exposing the photosensitive masking material to light comprises projecting one or more images on the photosensitive masking material, the one or more images being configured to cause the formation of one or more holes in the photosensitive masking material in a region not overlapping the structure of the cellular core and substantially avoid the formation of holes in the photosensitive masking material in a region overlapping a structure of the cellular core.

* * * * *